United States Patent
Yao et al.

(10) Patent No.: US 10,256,874 B2
(45) Date of Patent: Apr. 9, 2019

(54) DATA FEEDBACK METHODS AND RELATED APPARATUSES

(71) Applicant: Huawei Technologies Co., Ltd., Shenzhen (CN)

(72) Inventors: Zongming Yao, Shenzhen (CN); Menghong Liu, Shenzhen (CN); Linfeng Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/854,489

(22) Filed: Dec. 26, 2017

(65) Prior Publication Data

US 2018/0123655 A1 May 3, 2018

Related U.S. Application Data

(63) Continuation of application No. 13/869,479, filed on Apr. 24, 2013, now abandoned, which is a (Continued)

(30) Foreign Application Priority Data

Sep. 14, 2011 (CN) .......................... 2011 1 0271898

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0408* (2013.01); *H04B 7/063* (2013.01); *H04B 7/0617* (2013.01); *H04B 7/0452* (2013.01)

(58) Field of Classification Search
CPC .. H04B 7/0417; H04B 7/0408; H04B 7/0617; H04B 7/063; H04B 7/0452
See application file for complete search history.

(56) References Cited

U.S. PATENT DOCUMENTS

2002/0193146 A1  12/2002  Wallace et al.
2007/0253501 A1  11/2007  Yamaura
(Continued)

FOREIGN PATENT DOCUMENTS

| CN | 101064543 A | 10/2007 |
|---|---|---|
| CN | 101064544 A | 10/2007 |

(Continued)

OTHER PUBLICATIONS

Stacey et al., "Proposed TGac Draft Amendment; 11-10-1361-03-00ac-proposed-tgac-draft-amendment", IEEE SA Mentor; 11-10-1361-03-00AC-proposed-tgac-draft-amendment, IEEE SA Mentor, Piscataway, NJ, USA, vol. 802.11ac, No. 3, XP068035312, (Jan. 2011).

(Continued)

*Primary Examiner* — Sophia Vlahos
(74) *Attorney, Agent, or Firm* — Leydig, Voit & Mayer, Ltd.

(57) ABSTRACT

A data feedback method includes acquiring, by the beamformee, the number of columns from a null data packet announcement (NDPA) message; detecting the number of active first spatial streams; comparing the number of first spatial streams with the number of columns, and taking the smaller value obtained from the comparison as the number of second spatial streams required for feedback; and feeding back the number of second spatial streams and spatial stream measurement information about the second spatial streams to the beamformer.

17 Claims, 5 Drawing Sheets

Related U.S. Application Data continuation of application No. 13/838,420, filed on Mar. 15, 2013, now abandoned, which is a continuation of application No. PCT/CN2012/081255, filed on Sep. 11, 2012.

(51) Int. Cl.
*H04B 7/0408* (2017.01)
*H04B 7/0452* (2017.01)

(56) References Cited

U.S. PATENT DOCUMENTS

| | | |
|---|---|---|
| 2007/0258541 A1 | 11/2007 | Yamaura |
| 2008/0187062 A1 | 8/2008 | Pan et al. |
| 2010/0080173 A1 | 4/2010 | Takagi |
| 2011/0096796 A1 | 4/2011 | Zhang et al. |
| 2012/0020375 A1 | 1/2012 | Haruna |
| 2012/0257605 A1 | 10/2012 | Abraham et al. |
| 2012/0281631 A1 | 11/2012 | Yamaura |
| 2013/0315333 A1 | 11/2013 | Yamaura |
| 2014/0219378 A1 | 8/2014 | Yamaura et al. |

FOREIGN PATENT DOCUMENTS

| | | |
|---|---|---|
| CN | 101262264 A | 9/2008 |
| CN | 101326742 A | 12/2008 |
| JP | 2005516427 A | 6/2005 |
| JP | 2007318728 A | 12/2007 |
| JP | 2007318729 A | 12/2007 |
| WO | 2011103367 A1 | 8/2011 |

OTHER PUBLICATIONS

Stacey et al., "Proposed TGac Draft Amendment," IEEE 802.11-10/1361r3, pp. 1-12, Institute of Electrical and Electronics Engineers, pp. 1-12, (Jan. 18, 2011).

Vermani et al., "Dimension Reduction for MU-MIMO," IEEE 802.11-11/0053r1, pp. 1-11, Institute of Electrical and Electronics Engineers, (Jan. 17, 2011).

Stacey et al., "Specification Framework for TGac," IEEE 802.11-09/0992r21, pp. 1-51, Institute of Electrical and Electornics Engineers, New York, New York (Jan. 19, 2011).

Shapira et al., "Channel Dimension Reduction in MU Operation," IEEE 802.11-10/0803r0, Powerpoint, p. 1-23 (Jul. 2010).

Shapira, "Determination of Ng in MU Mode" IEEE 802.11-11/0995r0, PowerPoint, pp. 1-14 (Jul. 2011).

Merlin et al, "Sounding Protocol—Segmentation and Null Feedback", IEEE 802.11-11/0041r0, Powerpoint, Slides 1-18 (Jan. 18, 2011).

"Draft Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications, Amendment 5: Enhancements for Very High Throughput for Operation in Bands below 6 GHz." IEEE P802.11ac™/D1.0, pp. i-242, Institute of Electrical and Electronics Engineers, New York, New York (May 2011).

"IEEE802.11ac: The Next Evolution of Wi-Fi™ Standards," pp. i-12, Qualcomm Incorporated, San Diego, California (May 2012).

U.S. Appl. No. 13/869,479, filed Apr. 24, 2013.

U.S. Appl. No. 13/838,420, filed Mar. 15, 2013.

DATA FEEDBACK METHODS AND RELATED APPARATUSES

CROSS-REFERENCE TO RELATED APPLICATIONS

This application is a continuation of U.S. patent application Ser. No. 13/869,479, filed on Apr. 24, 2013, which is a continuation of U.S. patent application Ser. No. 13/838,420, filed on Mar. 15, 2013, which is a continuation of International Application No. PCT/CN2012/081255, filed on Sep. 11, 2012. The International Application claims priority to Chinese Patent Application No. 201110271898.2, filed on Sep. 14, 2011. All of the afore-mentioned patent applications are hereby incorporated by reference in their entireties.

FIELD OF THE APPLICATION

The present application relates to the communications field, and in particular, to data feedback methods and related apparatuses.

BACKGROUND OF THE APPLICATION

IEEE802.11ac is a branch of the IEEE802.11 protocol series and introduces a very-high-throughput probing mechanism, which is a channel detection mechanism between a beamformer and a beamformee. With this mechanism, the beamformer is capable of better knowing the situation of a channel between the beamformer and the beamformee. As such, the communication status can be improved by adjusting related parameters. In general, on a network constructed of a basic service set (BSS, Basic Service Set), the corresponding physical device of the Beamformer is an access point (AP, Access point) and that of the Beamformee is a station (STA, Station); and on a network that is not constructed of a basic service set, the corresponding physical device of the Beamformer may be a certain STA and that of the Beamformee may be another STA.

In the prior art, to prevent abnormal situations, IEEE802.11ac specifies that the number of actual active antennas of the beamformee must be larger than or equal to the number of columns (NC) set by the beamformer in a null data packet announcement (NDPA, Null data packet Announcement) message. Therefore, after receiving the NDPA message, the beamformee has no corresponding processing mechanism if it finds that the number of its actual active antennas is smaller than the number of columns set by the beamformer in the NDPA message. This leads to logical imprecision and disorder of IEEE802.11ac, finally affecting the design of related products.

SUMMARY OF THE APPLICATION

Embodiments below provide a data feedback method and related apparatuses. This enables a beamformer to adjust, according to related channel information fed back from a beamformee, the communication status no matter whether the number of actual active antennas of the beamformee is larger than or equal to the number of columns set by the beamformer in an NDPA message.

A data feedback method includes: acquiring, by a beamformee, the number of columns from a null data packet announcement NDPA message; detecting the number of active first spatial streams; comparing the number of first spatial streams with the number of columns and taking the smaller value obtained from the comparison as the number of second spatial streams required for feedback; and feeding back the number of second spatial streams and corresponding spatial stream measurement information about second spatial streams to a beamformer.

A data feedback method includes: acquiring, by a beamformee, the number of columns from a null data packet announcement NDPA message; detecting, by the beamformee, the number of active spatial streams; and determining, by the beamformee, whether the number of spatial streams is smaller than the number of columns, and, if yes, feeding back a null data packet to a beamformer.

A method for sending a null data packet announcement message includes: acquiring, by a beamformer, the number of active antennas of a beamformee during a capability negotiation process between the beamformer and the beamformee; setting, by the beamformer, the number of columns in an NDPA message according to the number of the antennas so that the number of columns is smaller than the number of the antennas; and sending, by the beamformer, the NDPA message to the beamformee.

A beamformee includes: a first acquiring unit, configured to acquire the number of columns from a null data packet announcement NDPA message; a detection unit, configured to detect the number of active first spatial streams; a comparison unit, configured to compare the number of first spatial streams with the number of columns and take the smaller value obtained from the comparison as the number of second spatial streams required for feedback; and a feedback unit, configured to feed back the number of second spatial streams and corresponding spatial stream measurement information to a beamformer.

A beamformee includes: a unit for acquiring the number of columns, configured to acquire the number of columns from a null data packet announcement NDPA message; a unit for detecting the number of spatial streams, configured to detect the number of active spatial streams; and a determining unit, configured to determine whether the number of spatial streams is smaller than the number of columns, and, if yes, trigger a null data packet feedback unit; and the null data packet feedback unit, configured to feed back a null data packet to a beamformer.

A beamformer includes: a unit for acquiring the number of antennas, configured to acquire the number of active antennas of a beamformee during a capability negotiation process between the beamformer and the beamformee; a unit for setting the number of columns, configured to set the number of columns in an NDPA message according to the number of antennas so that the number of columns is smaller than the number of antennas; and a message sending unit, configured to send the NDPA message to the beamformee.

It can be seen from the preceding technical solutions that, the embodiments have the following advantages: By comparing the number of active first spatial streams with the number of columns, a beamformee according to an embodiment takes the obtained smaller value as the number of second spatial streams required for feedback and feeds back this correct number of active second spatial streams to a beamformer. In this way, the beamformer is capable of timely knowing its actual communication status and correspondingly optimizing and adjusting the communication status.

DETAILED DESCRIPTION OF THE EMBODIMENTS

The embodiments provide a data feedback method and related apparatuses. This enables a beamformer to adjust, according to related channel information about a beamformee, the communication status no matter whether the number of actual active antennas of the beamformee is larger than or equal to the number of columns set by the beamformer in an NDPA message. In general, on a network constructed of a basic service set (BSS, Basic Service Set), the corresponding physical device of the beamformer (Beamformer) is an access point (AP, Access point) and that of the beamformee (Beamformee) is a station (STA, Station); and on a network that is not constructed of a basic service set, the corresponding physical device of the Beamformer may be a certain STA and that of the Beamformee may be another STA.

Figure 1:
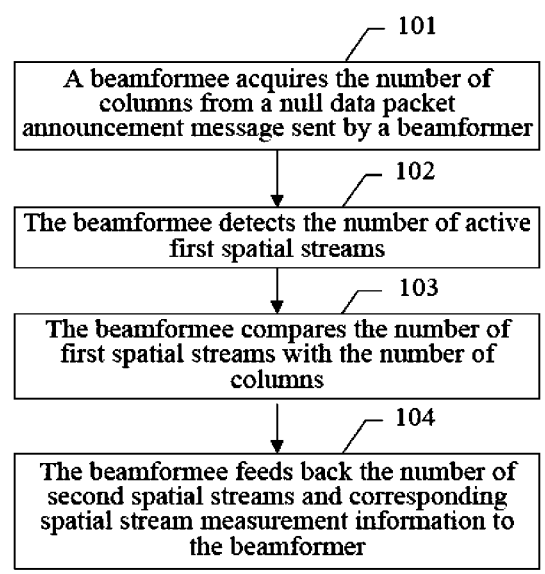
FIG. 1 is a schematic flowchart of a data feedback method according to an embodiment.

Referring to FIG. 1, an embodiment of a data feedback method in the present invention includes:

101. A beamformee acquires the number of columns from a null data packet announcement message sent by a beamformer.

The beamformee receives the NDPA message and determines that the beamformee is the one requested by a beamformer to send feedback, and extracts the number of columns of station information (STA Info, STA Information) from the NDPA message, where the number of columns is obtained by adding 1 to the value of the Nc Index field set by the beamformer in the NDPA message and is used to indicate the number of spatial streams that a STA needs to feed back.

102. The beamformee detects the number of active first spatial streams.

The beamformee detects spatial streams where data transmission exists and determines the number of active first spatial streams.

103. The beamformee compares the number of first spatial streams with the number of columns.

The beamformee compares the number of active first spatial streams with the number of columns in the NDPA message, and takes the smaller value obtained from the comparison as the number of second spatial streams required for feedback.

IEEE802.11ac specifies that the number of actual active antennas of the beamformee must be larger than or equal to the number of columns set by the beamformer in the NDPA message. However, in practical applications, the number of active antennas of the beamformee may be smaller than the number of columns set by the beamformer in the NDPA message because the beamformer has sent a probing request when the beamformee does not timely inform the beamformer of its reconfiguration or the beamformee cannot detect the actual number of antennas due to an antenna failure, or the like. In this case, if the beamformee forcedly feeds back certain invalid information about spatial streams that are not supported or the beamformee does not send feedback, the beamformer will incorrectly estimate the current channel situation or cannot optimize the communication status, thereby affecting the actual communication effect between the beamformee and the beamformer. However, in the embodiment, after the number of first spatial streams is compared with the number of columns, the smaller value obtained from the comparison is taken as the number of second spatial streams required for feedback. In this way, the beamformee is capable of feeding back the correct number of current active spatial streams to the beamformer no matter whether the number of actual active antennas of the beamformee is larger than or equal to the number of columns set by the beamformer in the NDPA message.

104. The beamformee feeds back the number of second spatial streams and corresponding spatial stream measurement information to the beamformer.

After obtaining the number of second spatial streams, the beamformee calculates spatial stream measurement information about the second spatial streams and feeds back the number of second spatial streams and corresponding spatial stream measurement information to the beamformer. Therefore, the beamformer is capable of calculating related operation matrix V according to the spatial stream measurement information to guide subsequent receiving and sending, thereby improving the communication performance of the entire system.

The spatial stream measurement information may include: average signal-to-noise ratio (Average SNR) information, feedback matrix V (Feedback Matrix V) information, and delta signal-to-noise ratio (Delta SNR) information that correspond to each spatial stream.

To prevent abnormal situations, IEEE802.11ac specifies that the number of actual active antennas of the beamformee must be larger than or equal to the number of columns (NC) set by the beamformer in the null data packet announcement (NDPA, Null data packet Announcement) message. As such, the beamformee returns related channel information about each of columns to the beamformer. This enables the beamformer to adjust the communication status according to the related channel information about each of columns. If the number of actual active spatial streams of the beamformee is smaller than the number of columns, the following two results occur: 1. The beamformee may forcedly feed back, according to the number of spatial streams that the number of columns indicates, invalid information about certain spatial streams that are not supported. However, the beamformer does not know this. Therefore, the beamformer incorrectly estimates the current channel situation and performs incorrect parameter configuration according to the current channel situation; 2. the beamformee may consider that it cannot support the number of spatial streams that the number of columns indicates, so that the beamformee does not send feedback. As such, the information about actual active spatial streams of the beamformee cannot be known by the beamformer. Therefore, the communication status cannot be optimized, greatly affecting the actual communication effect of the beamformee.

By comparing the number of active first spatial streams with the number of columns, the beamformee in the embodiment takes the smaller value obtained from the comparison as the number of second spatial streams required for feedback and feeds back this correct number of active second spatial streams to the beamformer. In this way, the beamformer is capable of timely knowing its actual communication status and correspondingly optimizing and adjusting the communication status.

Figure 2:
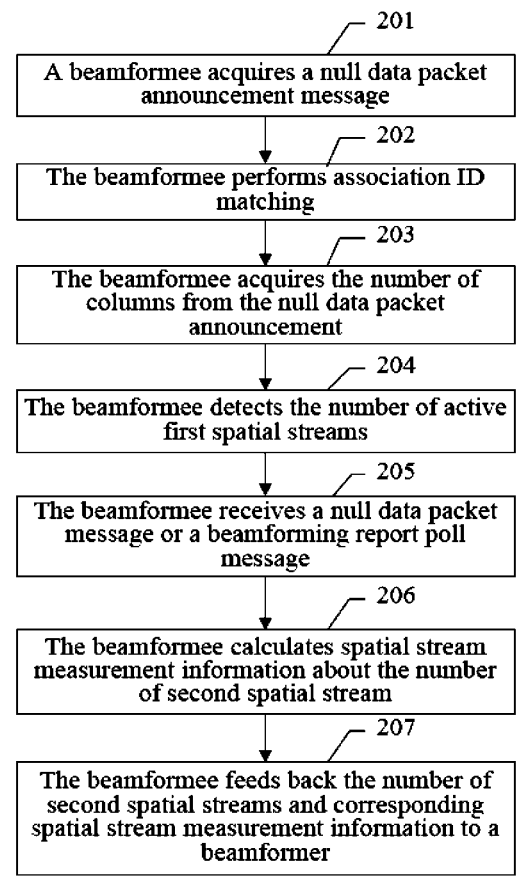
FIG. 2 is another schematic flowchart of a data feedback method according to an embodiment.

For better understanding, the following describes in detail the data feedback method in the preceding embodiment by using a specific application scenario. Referring to FIG. 2, another embodiment of a data feedback method according to the embodiments includes:

201. A beamformee acquires a null data packet announcement message.

A very-high-throughput probing mechanism may be applied to two scenarios: single-user multiple input multiple output (SU-MIMO) and multi-user multiple input multiple output (MU-MIMO) scenarios.

Figure 3:
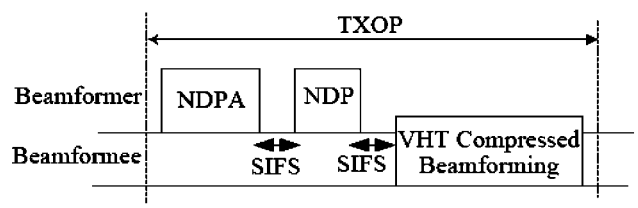
FIG. 3 is a signaling flowchart of a data feedback method according to an embodiment.

In the SU-MIMO scenario, one beamformee communicates with one beamformer (for a specific signaling flowchart, reference may be made to FIG. 3, where TXOP indicates Transmit Opportunity, and SIFS indicates Short Inter-Frame Space). Therefore, when the beamformee receives a unicast NDPA message, the transmission is SU-MIMO communication if a feedback type (Feedback Type) recorded in a STA Info field in the NDPA message is 0. If a locally stored association ID (AID, Association ID) matches the AID of the STA Info in the NDPA, the NDPA message is what the beamformee requires.

Figure 4:
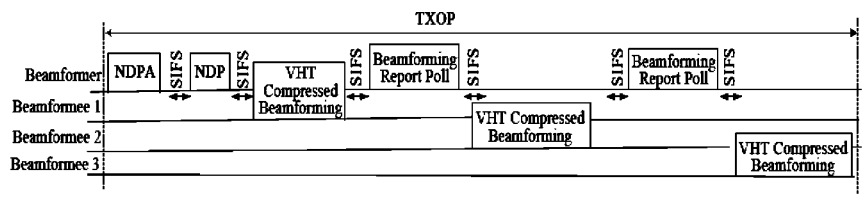
FIG. 4 is another signaling flowchart of a data feedback method according to an embodiment.

In the MU-MIMO scenario, one beamformer communicates with multiple beamformees (for a specific signaling flowchart, reference may be made to FIG. 4). Therefore, the NDPA message received by the beamformees is a broadcast packet sent by the beamformer. As such, when a beamformee receives the NDPA message, this transmission is MU-MIMO communication if the feedback type (Feedback Type) recorded in the STA Info field in the NDPA message is 1, and the beamformee needs to perform AID matching.

202. The beamformee performs association ID matching.

The beamformee extracts STA Info fields sequentially from the NDPA message and compares AIDs of the STA Info fields one by one with the locally stored AID. If a same AID is found, AID matching succeeds, which indicates that the NDPA message needs to be locally received. As such, the beamformee needs to feed back spatial stream measurement information, and step 203 is triggered. If a same AID is not found, AID matching fails, which indicates that the beamformee is not the specified one that is requested to send feedback.

203. The beamformee acquires the number of columns from the null data packet announcement.

After determining that the beamformee is the one requested by the beamformer to send feedback, the beamformee extracts and saves the number of columns and the feedback type of the STA Info from the NDPA message.

204. The beamformee detects the number of active first spatial streams.

In this embodiment, the content of step 204 is the same as that of step 102 in the preceding embodiment as shown in FIG. 1. Therefore, the content is not mentioned herein.

205. The beamformee receives a null data packet message or a beamforming report poll message.

The beamformee receives the null data packet (NDP, Null Data Packet) message and detects whether the locally stored AID is equal to the AID of the first STA Info field in the NDPA message, and, if yes, step 206 is triggered;

or, the beamformee detects whether it has received the beamforming report poll (Beamforming report poll) message, and, if yes, step 206 is triggered.

Referring to FIG. 4, in the MU-MIMO scenario, the beamformer first sends a broadcast packet of the NDPA message to instruct all related beamformees to prepare for probing. Then, the beamformer sends a broadcast packet of the NDP message, and all related beamformees calculate related channel feedback information according to the received broadcast packet of the NDP message. It should be noted that after the broadcast packet of the NDP message is received, spatial stream measurement information, which is calculated according to the received NDP message, can be immediately sent to the beamformer only when the AID of a beamformee is equal to the AID of the first STA Info field in the broadcast packet of the received NDPA message. For other beamformees, when they receive the beamforming report poll (Beamforming Report Poll) from the beamformer respectively, they send spatial stream measurement information, which is calculated according to the received broadcast packet of the NDP message, to the beamformer if they have received the broadcast packet of the NDP message; and if the broadcast packet of the NDP message is not received, a null data packet or no feedback is sent to the beamformer.

206. The beamformee calculates spatial stream measurement information about each of the second spatial streams.

The beamformee calculates the corresponding spatial stream measurement information about each of the second spatial streams according to the received NDP message.

207. The beamformee feeds back the number of second spatial streams and corresponding spatial stream measurement information to the beamformer.

The beamformee feeds back the number of second spatial streams and corresponding spatial stream measurement information to the beamformer. This enables the beamformer to calculate, according to the spatial stream measurement information, related operation matrix V to guide subsequent receiving and sending, thereby improving the communication performance of the entire system. Specifically, the beamformee encapsulates the number of second spatial streams and corresponding spatial stream measurement information in a very high throughput compressed beamforming (VHT Compressed Beamforming) message, and then feeds back the VHT Compressed Beamforming message to the beamformer.

The application scenario of the embodiment is illustrated above through some examples only, and it may be understood that, in actual applications, more application scenarios may exist, which is not specifically limited herein.

Figure 5:
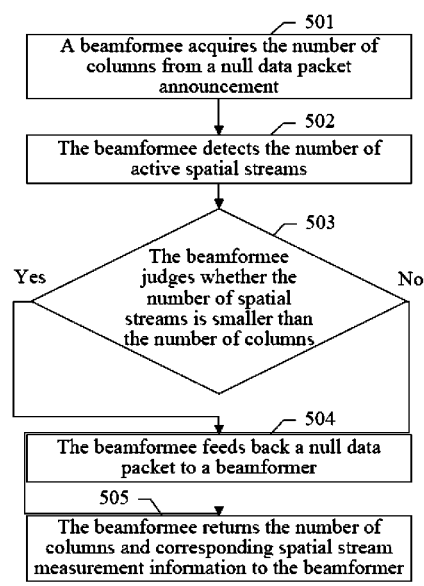
FIG. 5 is another schematic flowchart of a data feedback method according to an embodiment.

In addition to the method described in the preceding embodiment, another feedback mechanism can be used to prevent the situation that a beamformer incorrectly estimates the current channel situation or cannot optimize the communication status. For details, refer to FIG. 5. Another embodiment of a data feedback method in the present invention includes:

501. A beamformee acquires the number of columns from a null data packet announcement.

The beamformee receives the NDPA message and determines that the beamformee is the one requested by a beamformer to send feedback; and extracts the number of columns in STA Info from the NDPA message, where the number of columns is a field set by the beamformer in the NDPA message and is used to indicate the number of spatial streams that a STA needs to feed back.

502. The beamformee detects the number of active spatial streams.

The beamformee detects spatial streams where data transmission exists and determines the number of active spatial streams.

503. The beamformee determines whether the number of spatial streams is smaller than the number of columns.

The beamformee determines whether the number of active spatial streams is smaller than the number of columns in the NDPA message. If yes, step 504 is triggered. If not, step 505 is triggered.

504. The beamformee feeds back a null data packet to the beamformer.

The beamformee feeds back the null data packet to the beamformer. Specifically, this may be that the beamformee assembles a VHT Compressed Beamforming message, where the VHT Compressed Beamforming message does not carry any spatial stream measurement information, and then feeds back the VHT Compressed Beamforming message to the beamformer.

In the embodiment, the beamformee feeds back the null data packet to the beamformer. This enables the beamformer to know that the number of actual active spatial streams of the beamformee is smaller than the number of columns set by the beamformer in the NDPA message. In this way, the beamformer is capable of making a timely response, for example, sending a new NDPA message for measurement.

505. The beamformee returns the number of columns and corresponding spatial stream measurement information to the beamformer.

After determining that the number of active spatial streams is larger than or equal to the number of columns in the NDPA message, the beamformee calculates the number of columns and corresponding spatial stream measurement information according to a received NDP message. After obtaining the corresponding spatial stream measurement information about each of columns, the beamformee returns the corresponding spatial stream measurement information about each of columns to the beamformer. This enables the beamformer to calculate, according to the spatial stream measurement information, related operation matrix Q to guide subsequent receiving and sending, thereby improving the communication performance of the entire system. The operation matrix Q is deduced by the beamformer according to the feedback matrix V information sent by each beamformee and is used to instruct the beamformer to receive and send data.

Figure 6:
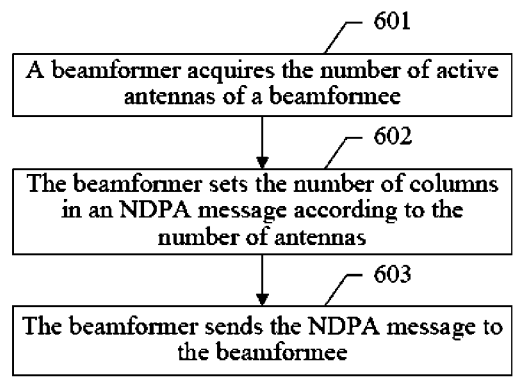
FIG. 6 is a schematic flowchart of a method for sending a null data packet announcement message according to an embodiment.

In addition to the preceding method at a beamformee end, an embodiment also provides a related method for a beamformee to solve the problem in feeding back spatial stream measurement information at a beamformer end. Referring to FIG. 6, an embodiment of a method for sending a null data packet announcement message in the present invention includes:

601. A beamformer acquires the number of active antennas of a beamformee.

During a capability negotiation process between the beamformer and the beamformee, the beamformer acquires the number of active antennas of the beamformee.

602. The beamformer sets the number of columns in an NDPA message according to the number of antennas.

During a very-high-throughput probing process between the beamformer and the beamformee, the beamformer needs to send the NDPA message to the beamformee. During the process that the beamformer frames the NDPA message, the beamformer sets the number of columns in the NDPA message according to the number of active antennas of the beamformee so that the number of columns is smaller than the number of antennas.

603. The beamformer sends the NDPA message to the beamformee.

The beamformer sends the NDPA message to the beamformee. This enables the beamformee to feed back, according to the NDPA message, the corresponding spatial stream measurement information about each of columns.

In the embodiment, during the capability negotiation process with the beamformee, the beamformer acquires the number of active antennas of the beamformee, so that when framing the NDPA message, the beamformer can set the number of columns according to that the number of active antennas of the beamformee must be larger than or equal to the number of columns in the NDPA message. Therefore, the beamformee end is capable of feeding back correct and valid spatial stream measurement information to the beamformer according to the existing 802.11ac mechanism.

Figure 7:
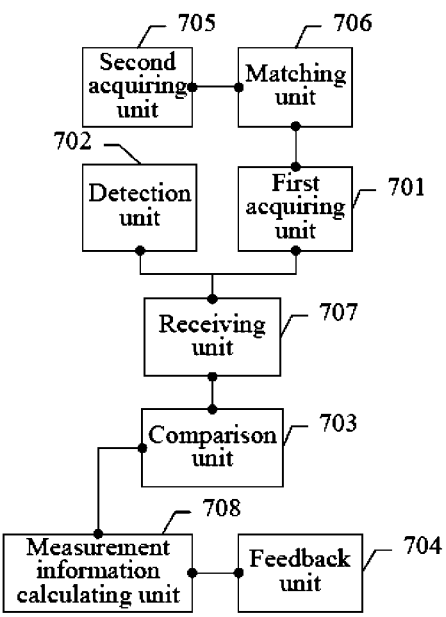
FIG. 7 is a schematic flowchart of a beamformee according to an embodiment.

The following describes an embodiment in the present invention of a beamformee that is configured to execute the preceding data feedback method. For the logic structure, refer to FIG. 7. The beamformee in an embodiment includes:

a first acquiring unit 701, configured to acquire the number of columns from a null data packet announcement NDPA message;

a detection unit 702, configured to detect the number of active first spatial streams;

a comparison unit 703, configured to compare the number of first spatial streams with the number of columns, and take the smaller value obtained from the comparison as the number of second spatial streams required for feedback; and a feedback unit 704, configured to feed back the number of second spatial streams and spatial stream measurement information about the second spatial streams to a beamformer.

In the embodiment, the beamformee may further include:

a second acquiring unit 705, configured to acquire the NDPA message;

a matching unit 706, configured to match the AID of a STA Info field in the NDPA message, and trigger the first acquiring unit 701 if AID matching succeeds;

a receiving unit 707, configured to receive an NDP message, detect whether a locally stored AID is equal to the AID of the first STA Info field in the NDPA message, and, if yes, trigger the comparison unit 703; and a measurement information calculating unit 708, configured to calculate spatial stream measurement information about each of second spatial streams according to the received NDP message after the number of second spatial streams required for feedback is determined.

In the embodiment, the specific interaction process of each unit of the beamformee is as follows:

The first acquiring unit 701 extracts the number of columns in STA Info from the NDPA message, where the number of columns is a field set by the beamformer in the NDPA message and is used to indicate the number of spatial streams that a STA needs to feed back.

The detection unit 702 detects spatial streams where data transmission exists and determines the number of active first spatial streams.

Before extraction of the number of columns in STA Info from the NDPA message, the second acquiring unit 705 of the beamformee first acquires the NDPA message. If the feedback type (Feedback Type) recorded in the STA Info field in the NDPA message is 0, the transmission is SU-MIMO communication. If the locally cached AID is the same as the AID of the NDPA STA Info field, the NDPA message needs to be received locally, and the beamformee needs to feed back spatial stream measurement information.

In addition, the first acquiring unit 701 is triggered. Otherwise, the beamformee is not the specified one that is requested to send feedback. If the feedback type (Feedback Type) recorded in the STA Info field in the NDPA message is 1, the transmission is MU-MIMU communication, and the matching unit 706 needs to be triggered to match the association ID AID of the station information STA Info field in the NDPA message. Specifically, AID matching is as follows: The matching unit 706 extracts STA Info fields sequentially from the NDPA message and compares AIDs in the STA Info fields one by one with the locally stored AID. If a same AID is found, AID matching succeeds, which indicates that the NDPA message needs to be locally received. As such, the beamformee needs to feed back the spatial stream measurement information, and the first acquiring unit 701 is triggered. If a same AID is not found, AID matching fails, which indicates that the beamformee is not the specified one that is requested to send feedback.

After the number of columns in the NDPA message and the number of active first spatial streams are obtained, the comparison unit 703 compares the number of active first spatial streams with the number of columns in the NDPA message, and takes the smaller value obtained from the comparison as the number of second spatial streams required for feedback. Optionally, before the comparison unit 703 executes the operation, the receiving unit 707 of the beamformee receives the NDP message and detects whether the AID in the NDP message is equal to the AID of the first STA Info field in the NDPA message. If yes, the comparison unit 703 is triggered.

After the number of second spatial streams is determined, the measurement information calculating unit 708 calculates the corresponding spatial stream measurement information about each of the second spatial streams according to the received NDP message.

After the corresponding spatial stream measurement information about each of the second spatial streams is obtained, the feedback unit 704 feeds back the number of second spatial streams and corresponding spatial stream measurement information to the beamformer. This enables the beamformer to calculate, according to the spatial stream measurement information, related operation matrix Q to guide subsequent receiving and sending, thereby improving the communication performance of the entire system. Specifically, the beamformee encapsulates the number of second spatial streams and corresponding spatial stream measurement information in a very high throughput compressed beamforming (VHT Compressed Beamforming) message, and then feeds back the VHT Compressed Beamforming message to the beamformer.

Figure 8:
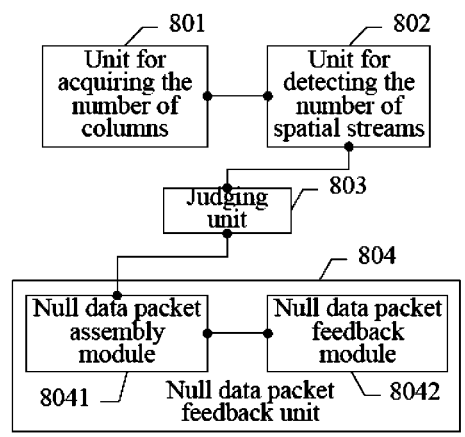
FIG. 8 is another schematic flowchart of a beamformee according to an embodiment.

The following describes an embodiment in the present invention of a beamformee that is configured to execute the preceding data feedback method. For the logic structure, refer to FIG. 8. The beamformee in another embodiment includes:

a unit 801 for acquiring the number of columns, configured to acquire the number of columns from a null data packet announcement NDPA message;

a unit 802 for detecting the number of spatial streams, configured to detect the number of active spatial streams;

a determining unit 803, configured to determine whether the number of spatial streams is smaller than the number of columns, and, if yes, trigger a null data packet feedback unit; and a null data packet feedback unit 804, configured to feed back a null data packet to a beamformer.

In the embodiment, the null data packet feedback unit may include:

a null data packet assembly module 8041, configured to assemble a VHT Compressed Beamforming message, where the VHT Compressed Beamforming message does not carry any spatial stream measurement information; and a null data packet feedback module 8042, configured to feed back the VHT Compressed Beamforming message to the beamformer.

In the embodiment, the specific interaction process of each unit of the beamformee is as follows:

The beamformee receives the NDPA message and determines that the beamformee is the one requested by the beamformer to send feedback; and the unit 801 for acquiring the number of columns extracts the number of columns in STA Info from the NDPA message, where the number of columns is a field set by the beamformer in the NDPA message and is used to indicate the number of spatial streams that a STA needs to feed back.

The unit 802 for detecting the number of spatial streams detects spatial streams where data transmission exists and determines the number of active spatial streams.

After the number of columns in the NDPA message and the number of active spatial streams are obtained, the determining unit 803 determines whether the number of active spatial streams is smaller than the number of columns in the NDPA message. If yes, the null data packet feedback unit 804 is triggered to feed back a null data packet to the beamformer. Specifically, this may be that the null data packet assembly module 8041 assembles the VHT Compressed Beamforming message, where the VHT Compressed Beamforming message does not carry any spatial stream measurement information; and then, the null data packet feedback module 8042 feeds back the VHT Compressed Beamforming message to the beamformer.

Figure 9:
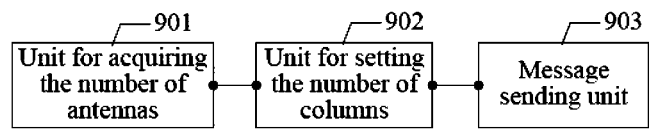
FIG. 9 is a schematic flowchart of a beamformer according to an embodiment.

The following describes an embodiment in the present invention of a beamformer that is configured to execute the preceding method for sending a null data packet announcement message. For the logic structure, refer to FIG. 9. The beamformer in an embodiment includes:

a unit 901 for acquiring the number of antennas, configured to acquire the number of active antennas of a beamformee during a capability negotiation process between a beamformer and the beamformee;

a unit 902 for setting the number of columns, configured to set the number of columns in an NDPA message according to the number of antennas so that the number of columns is smaller than the number of antennas; and a message sending unit 903, configured to send the NDPA message to the beamformee.

In the embodiment, the specific interaction process of each unit of the beamformer is as follows:

During the capability negotiation process between the beamformer and the beamformee, the unit 901 for acquiring the number of antennas in the beamformer acquires the number of active antennas of the beamformee.

After the number of active antennas of the beamformee is acquired, the beamformer needs to send the NDPA message to the beamformee during a very-high-throughput probing process between the beamformer and the beamformee. During the process that the beamformer frames the NDPA message, the unit 902 for setting the number of columns sets the number of columns in the NDPA message according to the number of active antennas of the beamformee so that the number of columns is smaller than the number of antennas.

After the NDPA message is framed, the message sending unit 903 sends the NDPA message to the beamformee. This enables the beamformee to feed back, according to the NDPA message, the corresponding spatial stream measurement information about each of columns. In the embodiment, during the capability negotiation process with the beamformee, the beamformer acquires the number of active antennas of the beamformee, so that when framing the NDPA message, the beamformer can set the number of columns according to that the number of active antennas of the beamformee must be larger than or equal to the number of columns in the NDPA message. Therefore, the beamformee end is capable of feeding back correct and valid spatial stream measurement information to the beamformer according to the existing 802.11ac mechanism.

In the several embodiments provided in the present application, it should be understood that the disclosed apparatus and method may be implemented in other manners. For example, the described apparatus embodiment is merely exemplary. For example, the unit division is merely logical function division and may be other division in practical implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of a software functional unit and sold or used as an independent product, the integrated unit may be stored in a computer-readable storage medium. Based on such an understanding, the technical solutions described herein, or the part contributing to the prior art, or all or a part of the technical solutions may be implemented in the form of a software product. The computer software product is stored in a storage medium and includes several instructions for instructing a computer device (which may be a personal computer, a server, a network device, and the like) to perform all or a part of steps of the methods described in the embodiments. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing embodiments are merely exemplary embodiments and are not understood to limit the protection scope of the claims. The claims are indented to cover any variations or replacement readily figured out by persons skilled in the art within the technical scope.

What is claimed is:

1. A data feedback method comprising:
   acquiring, by a beamformee, a quantity of columns from a null data packet announcement (NDPA) message;
   detecting, by the beamformee, a quantity of active first spatial streams;
   comparing, by the beamformee, a quantity of first spatial streams and the quantity of columns;
   determining a smaller value obtained from the comparison to be a quantity of second spatial streams required for feedback; and
   feeding back, by the beamformee, the quantity of second spatial streams and spatial stream measurement information about the second spatial streams to a beamformer,
   wherein detecting the quantity of active first spatial streams comprises detecting spatial streams where data transmission exists and determining the quantity of the active first spatial streams.

2. The method according to claim 1, wherein the spatial stream measurement information comprises:
   average signal-to-noise ratio information, feedback matrix V information, and delta signal-to-noise ratio information that correspond to each of the second spatial streams.

3. The method according to claim 1, wherein before the acquiring, by the beamformee, the quantity of columns from the NDPA message, the method further comprises:
   acquiring, by the beamformee, the NDPA message;
   matching, by the beamformee, an association ID (AID) of a station (STA) information field in the NDPA message; and
   triggering acquisition of the quantity of columns from the NDPA message if AID matching succeeds.

4. The method according to claim 3, wherein the matching, by the beamformee, the AID of the STA information field in the NDPA message comprises:
   extracting, by the beamformee, STA information fields sequentially from the NDPA message; and
   comparing, by the beamformee, AIDs of the STA information fields with a locally stored AID one by one;
   determining that AID matching succeeds when one of the AIDs matches the locally stored AID; and
   determining that AID matching is unsuccessful otherwise.

5. The method according to claim 3, wherein before the comparing, by the beamformee, the quantity of first spatial streams and the quantity of columns, the method further comprises:
   receiving, by the beamformee, a null data packet (NDP) message;
   determining whether a locally stored AID is equal to the AID of the first STA information field in the NDPA message; and,
   if the locally stored AID is equal to the AID of the first STA information field in the NDPA message, comparing the quantity of first spatial streams with the quantity of columns.

6. The method according to claim 5, wherein before the feeding back, by the beamformee, the quantity of second spatial streams and spatial stream measurement information about the second spatial streams to the beamformer, the method further comprises:
   calculating, by the beamformee, the spatial stream measurement information about each of the second spatial streams according to the received NDP message.

7. The method according to claim 1, wherein the feeding back, by the beamformee, the quantity of second spatial streams and spatial stream measurement information about the second spatial streams to a beamformer comprises:
   encapsulating, by the beamformee, the quantity of second spatial streams and spatial stream measurement information about each of the second spatial streams in a very high throughput (VHT) compressed beamforming message; and feeding back, by the beamformee, the VHT compressed beamforming message to the beamformer.

8. A beamformee comprising:

a processor;

a receiver configured to cooperate with the processor to acquire a quantity of columns from a null data packet announcement (NDPA) message;

the processor configured to detect a quantity of active first spatial streams;

compare a quantity of first spatial streams with the quantity of columns; and determine a smaller value obtained from the comparison to be a number of second spatial streams required for feedback; and a transmitter configured to cooperate with the processor to feed back the number of second spatial streams and spatial stream measurement information about the second spatial streams to a beamformer;

wherein the processor is further configured to detect spatial streams where data transmission exists and determine the quantity of the active first spatial streams.

9. The beamformee according to claim 8, wherein:

the receiver is further configured to acquire an NDPA message; and the processor is further configured to match an association ID (AID) of a station (STA) information field in the NDPA message, and trigger the receiver to acquire the NDPA message if AID matching succeeds.

10. The beamformee according to claim 8, wherein:

the receiver is further configured to receive an NDPA message, detect whether a locally cached association ID (AID) is equal to an AID of a first station (STA) information field in the NDPA message, and, if the locally cached AID is equal to the AID of the first STA information field, trigger the comparison unit; and the processor is further configured to calculate spatial stream measurement information about each of the second spatial streams according to the received NDPA message after the number of second spatial streams required for feedback is determined.

11. A non-transitory computer readable medium storing instructions for execution by a processor, the instructions configuring the processor to perform the following to form a beamformee acquire a quantity of columns from a null data packet announcement (NDPA) message;

detect a quantity of active first spatial streams;

compare a quantity of first spatial streams and the quantity of columns;

determine a smaller value obtained from the comparison to be a quantity of second spatial streams required for feedback; and feedback the quantity of second spatial streams and spatial stream measurement information about the second spatial streams to a beamformer, wherein detecting the quantity of active first spatial streams comprises detecting spatial streams where data transmission exists and determining the quantity of the active first spatial streams.

12. The non-transitory computer readable medium according to claim 11, wherein the spatial stream measurement information comprises average signal-to-noise ratio information, feedback matrix V information, and delta signal-to-noise ratio information that correspond to each of the second spatial streams.

13. The non-transitory computer readable medium according to claim 11, wherein the instructions further configure the processor to cause the beamformee to:

acquire the NDPA message;

match an association ID (AID) of a station (STA) information field in the NDPA message; and trigger acquisition of the quantity of columns from the NDPA message if AID matching succeeds.

14. The non-transitory computer readable medium according to claim 13, wherein the instructions further configure the processor to cause the beamformee to:

extract STA information fields sequentially from the NDPA message; and compare AIDs of the STA information fields with a locally stored AID one by one;

determine that AID matching succeeds when one of the AIDs matches the locally stored AID; and determine that AID matching is unsuccessful otherwise.

15. The non-transitory computer readable medium according to claim 13, wherein the instructions further configure the processor to cause the beamformee to:

receive a null data packet (NDP) message;

determine whether a locally stored AID is equal to the AID of the first STA information field in the NDPA message; and, if the locally stored AID is equal to the AID of the first STA information field in the NDPA message, comparing the quantity of first spatial streams with the quantity of columns.

16. The non-transitory computer readable medium according to claim 15, wherein the instructions further configure the processor to cause the beamformee to:

calculate the spatial stream measurement information about each of the second spatial streams according to the received NDP message.

17. The non-transitory computer readable medium according to claim 11, wherein the instructions further configure the processor to cause the beamformee to:

encapsulate the quantity of second spatial streams and spatial stream measurement information about each of the second spatial streams in a very high throughput (VHT) compressed beamforming message; and feedback the VHT compressed beamforming message to the beamformer.

\* \* \* \* \*